United States Patent
Dowle et al.

(10) Patent No.: US 10,220,879 B2
(45) Date of Patent: Mar. 5, 2019

(54) VEHICLE AND CHASSIS

(71) Applicant: Gordon Murray Design Limited, Shatford, Surrey (GB)

(72) Inventors: James Dowle, Reading (GB); Frank Coppuck, Hook (GB); Ian Gordon Murray, Puttenham (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 16 days.

(21) Appl. No.: 15/326,188

(22) PCT Filed: Jul. 8, 2015

(86) PCT No.: PCT/EP2015/065617
§ 371 (c)(1),
(2) Date: Jan. 13, 2017

(87) PCT Pub. No.: WO2016/008785
PCT Pub. Date: Jan. 21, 2016

(65) Prior Publication Data
US 2017/0197658 A1    Jul. 13, 2017

(30) Foreign Application Priority Data
Jul. 15, 2014  (GB) .................................. 1412523.1

(51) Int. Cl.
*B62D 21/02*    (2006.01)
*B60G 3/14*    (2006.01)
(Continued)

(52) U.S. Cl.
CPC ............... *B62D 21/02* (2013.01); *B60G 3/14* (2013.01); *B60G 7/001* (2013.01); *B62D 21/11* (2013.01);
(Continued)

(58) Field of Classification Search
CPC ........ B62D 21/02; B62D 29/00; B62D 23/00; B62D 21/11; B60G 7/001; B60G 3/14; B60Y 2200/14
See application file for complete search history.

(56) References Cited

U.S. PATENT DOCUMENTS 2,110,819 A * 3/1938 Poirier ..................... B60G 3/24
                                                        267/247
3,007,715 A * 11/1961 Maharick ................. B60G 7/02
                                                        267/67
(Continued)

FOREIGN PATENT DOCUMENTS

| FR | 2844766 A1 | 3/2004 |
|----|-----------|--------|
| GB | 2492786 A | 1/2013 |
| WO | 2007112118 A2 | 10/2007 |

OTHER PUBLICATIONS

International Search Report issued for International application No. PCT/EP2015/065617, dated Sep. 29, 2015.
(Continued)

*Primary Examiner* — Darlene P Condra
(74) *Attorney, Agent, or Firm* — Westman, Champlin & Koehler, P.A.; Z. Peter Sawicki; Amanda M. Prose

(57) ABSTRACT

A vehicle with a load space to provide a chassis comprising a framework (10) comprising a pair of spaced-apart elongate longitudinal members (12, 14) connected by a pair of spaced-apart elongate lateral members (20, 22) and bracing for the thus-defined framework, a rear suspension attached to the rearmost lateral member (20) and comprising a trailing-arm arrangement (52), and a front suspension attached to the front most lateral member (22) and comprising a leading-arm arrangement (58). This creates a rigid core for the chassis, which also provides all four suspension mounting points.

15 Claims, 4 Drawing Sheets

(51) Int. Cl.
*B60G 7/00* (2006.01)
*B62D 21/11* (2006.01)
*B62D 23/00* (2006.01)
*B62D 29/00* (2006.01)

(52) U.S. Cl.
CPC ............ *B62D 23/00* (2013.01); *B62D 29/00* (2013.01); *B60Y 2200/14* (2013.01)

(56) References Cited

U.S. PATENT DOCUMENTS

| | | | | |
|---|---|---|---|---|
| 5,584,510 A * | 12/1996 | Thuliez | ................. | B62D 21/02 180/65.1 |
| 6,073,991 A * | 6/2000 | Naert | ................. | B60G 7/001 296/187.02 |
| 6,129,367 A * | 10/2000 | Bublies | ................. | B60G 7/001 180/349 |
| 6,808,191 B1 * | 10/2004 | Buhl | ................. | B60G 7/005 280/124.107 |
| 6,986,519 B2 * | 1/2006 | Smith | ................. | B60G 3/14 180/291 |
| 7,559,400 B2 * | 7/2009 | Smith | ................. | B60G 3/14 180/291 |
| 8,052,204 B2 * | 11/2011 | Boettcher | ................. | B62D 21/02 280/785 |
| 2004/0239091 A1 * | 12/2004 | Horton | ................. | B62D 21/02 280/781 |
| 2009/0230729 A1 * | 9/2009 | Lusk | ................. | B29C 70/443 296/193.07 |
| 2010/0213682 A1 * | 8/2010 | Luna | ................. | B60G 7/001 280/124.153 |
| 2013/0206496 A1 * | 8/2013 | Hashimoto | ................. | B62D 21/12 180/291 |
| 2015/0137558 A1 * | 5/2015 | Ayuzawa | ................. | B62D 25/2036 296/193.07 |

OTHER PUBLICATIONS

Written Opinion of the International Searching Authority issued for International application No. PCT/EP2015/065617, dated Sep. 29, 2015.

* cited by examiner

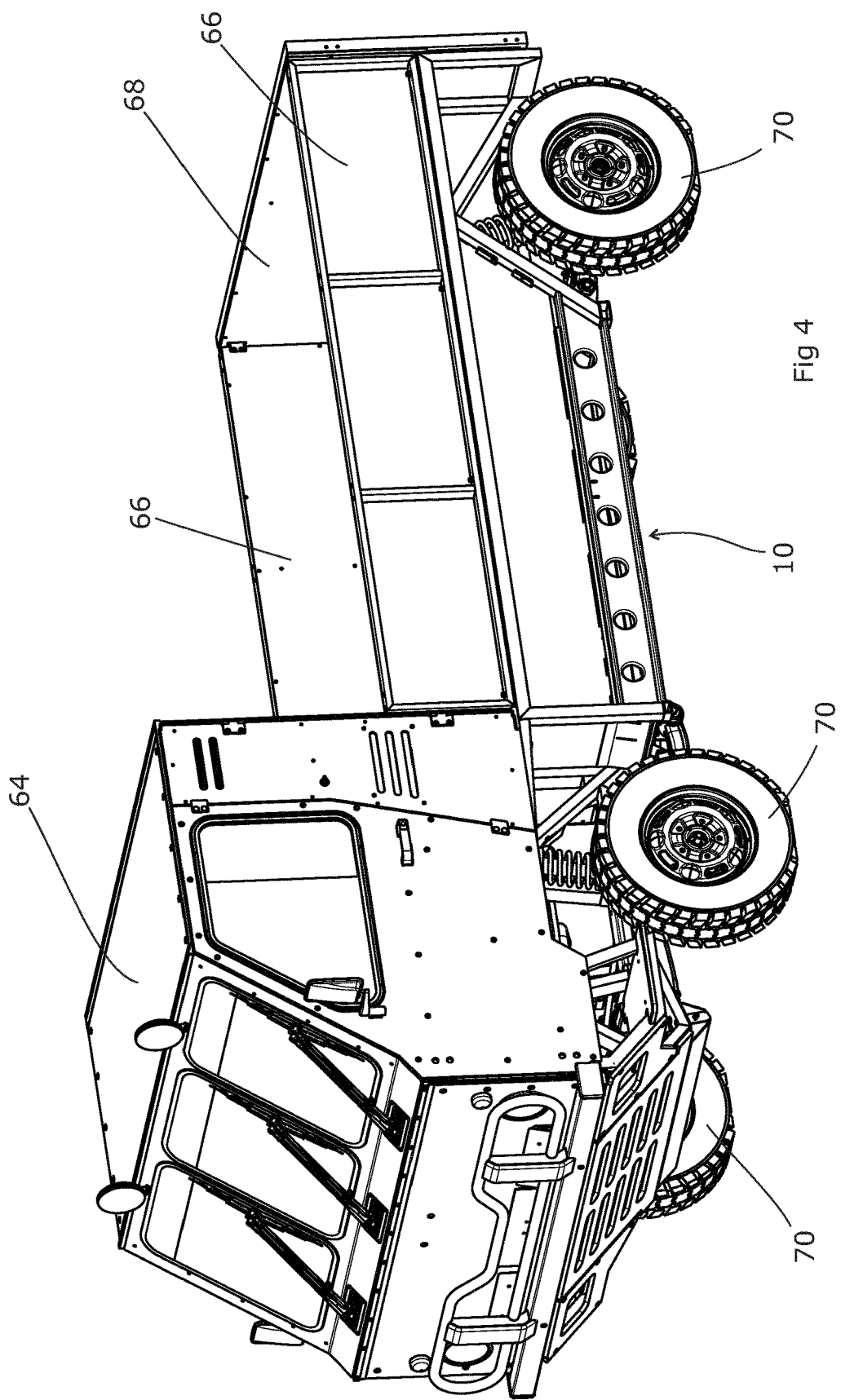

VEHICLE AND CHASSIS

This application is a Section 371 National Stage Application of International Application No. PCT/EP2015/065617, filed Jul. 8, 2015, and published as WO2016/008785 A1 on Jan. 21, 2016, which claims priority to and benefits of GB Patent Application Serial No. 1412523.1 filed Jul. 15, 2014, the entire contents of which are incorporated herein by reference.

FIELD OF THE INVENTION

The present invention relates to vehicles and the design of their chassis.

BACKGROUND ART

Our earlier patent applications WO2009/122178 and WO2010/149981 dealt with the design of a lightweight, low cost chassis that was particularly suitable for use in a lightweight city car. That chassis comprises a three-dimensional framework of tubular-section members reinforced with composite panels so as to create a chassis that is strong, rigid and light and which can be designed around a wide range of vehicle shapes.

SUMMARY OF THE INVENTION

One vehicle shape to which these design principles can be extended is a vehicle having a significant flat load space. Part of the rigidity of the chassis of WO2009/122178 and WO2010/149981 comes from its three-dimensional structure, so although the load space can be designed as a generally flat area in the centre of a three-dimensional structure, there is an opportunity to refine the design so as to extend the benefits of the design principle to this context.

Thus, the present invention provides a vehicle comprising a chassis, comprising a framework comprising a pair of spaced-apart elongate longitudinal members connected by a pair of spaced-apart elongate lateral members, and bracing for the thus-defined framework, a rear suspension attached to the rearmost lateral member and comprising a trailing-arm arrangement, and a front suspension attached to the frontmost lateral member and comprising a leading-arm arrangement.

This creates a rigid core for the chassis, which also provides all four suspension mounting points. The chassis can include members extending beyond the core (and usually will) but these need not be as rigid (and hence as heavy) as the core, as they do not need to carry suspension loads. The result is a significant saving of materials and weight in the overall structure.

The elongate members are preferably substantially straight, and can be an open channel section or a tubular section such as a box section or circular section. Naturally, we prefer that the thus-defined framework is flat.

The bracing can comprise cross-members extending within the framework. These can extend from one lateral member to the other, ideally diagonally. Alternatively, or preferably in addition, the bracing can comprise a panel securely attached to the framework such as via adhesive bonding. The panel is ideally flat, at least in the region attached to the thus-defined framework. It can be of a composite material, such as a glass- or carbon-fibre reinforced composite, or plywood (such as engineered composite plywood), or of other suitable materials.

BRIEF DESCRIPTION OF THE DRAWINGS

An embodiment of the present invention will now be described by way of example, with reference to the accompanying figures in which;

FIG. 4 shows the complete vehicle.

DETAILED DESCRIPTION OF THE EMBODIMENTS

Figure 1:
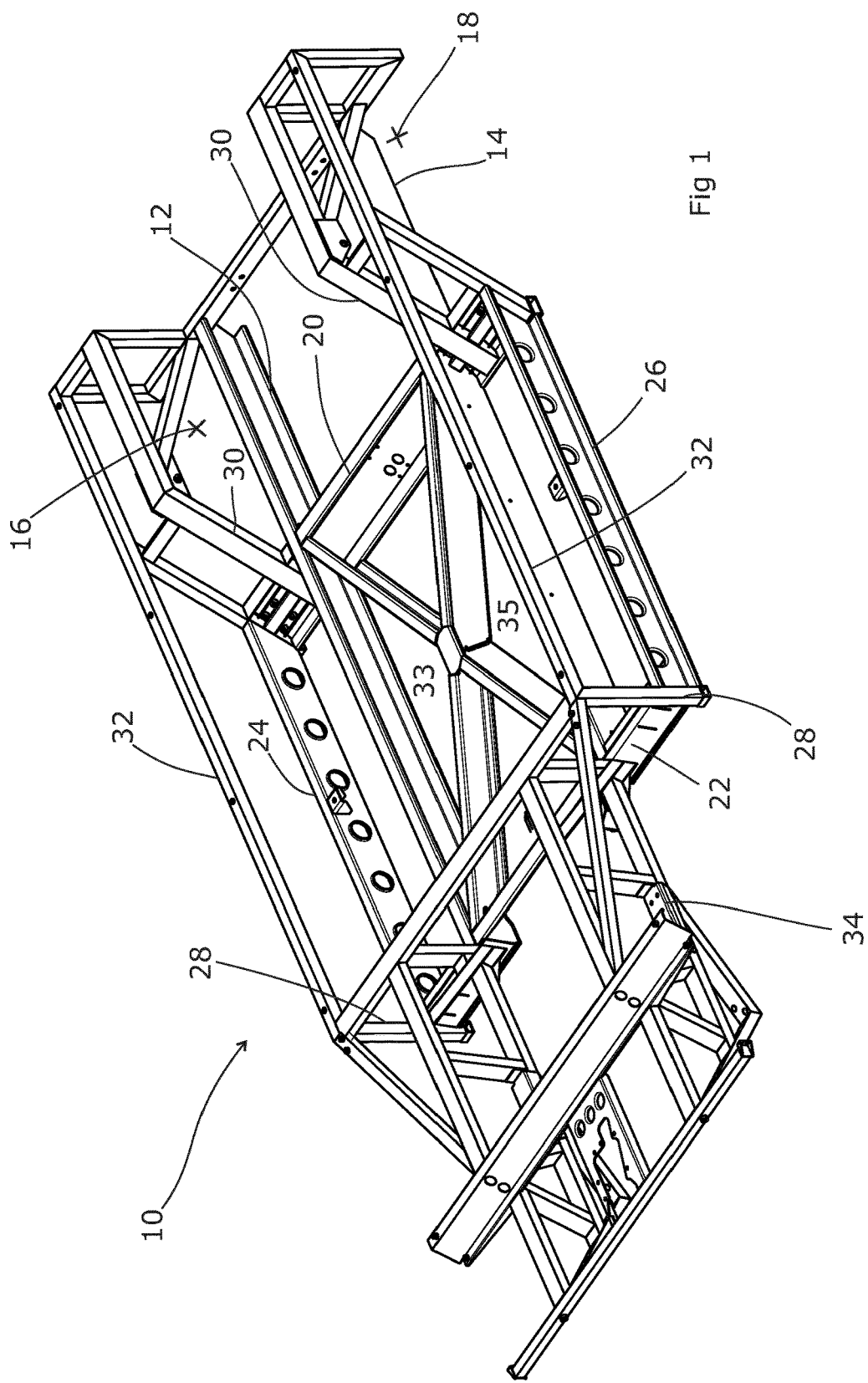
FIG. 1 shows the framework forming part of the chassis of the present invention.

Referring to FIG. 1, the chassis framework 10 of the present invention is built up around a central rigid core which includes two longitudinal members 12, 14 which run from a rear of the vehicle to the front of the load space, just inboard of the rear wheel arches 16, 18, and two lateral members 20, 22 which run from one side of the vehicle to the other side The lateral members 20, 22 thus cross the longitudinal members 12, 14, doing so perpendicularly. A box is therefore formed at the centre of the vehicle by these four members.

As noted, the longitudinal members 12, 14 run inboard of the wheel arches 16, 18 and are thus spaced inwardly from the edges of the vehicle. The lateral members 20, 22 extend across the width of the vehicle and thus (save for jointing arrangements) extend beyond the longitudinal members. A pair of outer members 24, 26 thus run between the ends of the lateral members 20, 22. These do of course define a further box framework at the centre of the chassis.

The longitudinal members 12, 14 are I-beam sections, and the lateral members 20, 22 are a slanted I-beam section. The rear lateral member 20 slants upwardly toward the rear of the vehicle, whereas the front lateral member 22 slants upwardly towards the front of the vehicle. The outer members 24, 26 are made of C-section beams. The use of open channel sections in this area of the chassis assists greatly in allowing water to leave the structure, mud to be cleaned off, and so on. Thus, the chassis can be left in a cleaner state after off-road work such as wading and the like, reducing the likelihood or the rate of corrosion.

This central frameworks are then built up into a useful chassis shape by way of uprights 28, 30, runners 32, and other members which define the side walls of the load space. A front section 34 is attached to the central frameworks and supports a personnel cab.

Figure 2:
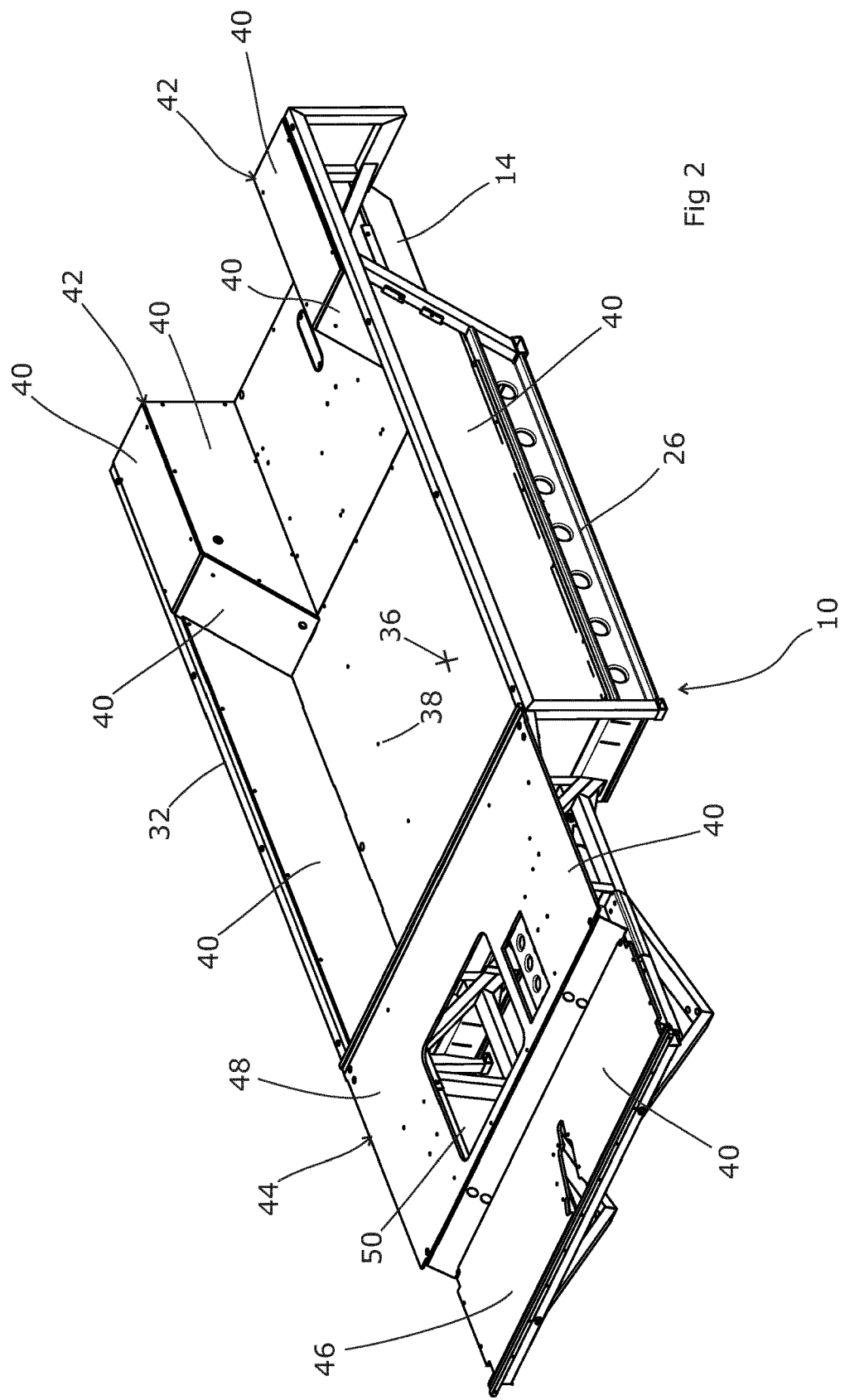
FIG. 2 shows the framework with the bracing panels attached.

The central frameworks are reinforced with a number of bracing structures. A first is shown in FIG. 1 and consists of a pair of diagonal bracing struts 33, 35 extending across the diagonals of the rectangle defined by the longitudinal members 12, 14 and the lateral members 20, 22, joining at the centre of the rectangle. A second is shown in FIG. 2 and consists of a panel 36 which is adhesively bonded to the longitudinal members 12, 14, the lateral members 20, 22, and the outer members 24, 26. It is also bolted to them via bolts 38 for additional security. Both arrangements increase the rigidity of the central frameworks and make them suitable for bearing cargo and suspension loads, and increase the rigidity of chassis. Other panels 40 are attached to the remaining regions of the chassis 10, partly to provide floors, walls etc for the load space and the cabin but also to provide bracing for the remaining parts of the structure and thus improve their strength and its rigidity.

The chassis as shown in FIG. 2 thus comprises a load space with walls on three sides (i.e. all but the rear edge, where a tailgate would normally be provided). Towards the rear of the two side walls, there are intrusions in the form of the wheel arches 42. These and the side walls give the framework around the load space a three-dimensional character which, together with the bracing by the various panels tends to further strengthen the chassis. A cabin chassis section 44 extends from the front of the load space, in the form of a three-dimensional framework braced with flat panels providing a largely flat upper surface to act as the floor of the cabin. A step part-way along the cabin floor delineates a frontal lower section 46 which can act as a footwell in front of a slightly higher section 48 which includes an aperture 50 to accommodate an upper part of the engine, above which seating can be provided.

Figure 3:
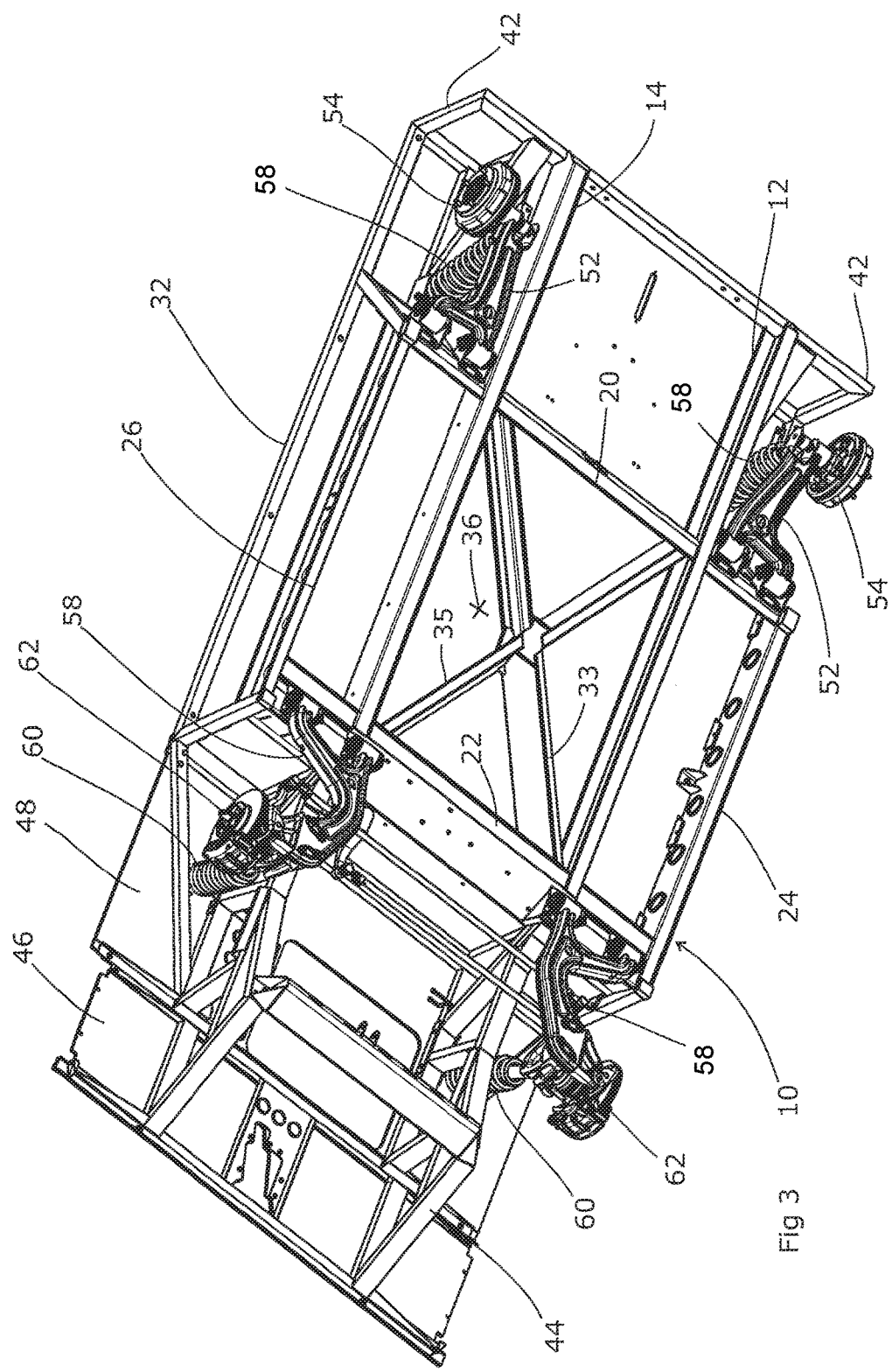
FIG. 3 shows the chassis from beneath, with the suspension attached.

FIG. 3 shows the underside of the chassis 10 with the suspension attached. A pair of trailing-arm suspension arms 52 are attached to the rear lateral member 20 so as to place a rear wheel hub 54 in each of the rear wheel arches 42. Each trailing arm 52 is supported by a spring and damper unit 56 which extends upwards from a free end of the trailing arm 52 to a mounting point in the upper part of the wheel arch 42. Each trailing arm 52 has a pair of pivot points at its front which are attached to mountings provided on the rear lateral member 20 to allow the trailing arm to swing upwards and downwards (subject to the spring and damper units 56).

At the front, a pair of leading-arm suspension arms 58 are likewise attached to the front lateral member 22. Each leading arm 58 is supported by a spring and damper unit 60 which extends upwards from a free end of the trailing arm 58 to a mounting point on the underside of the cabin section 44. Each leading arm 58 has a pair of pivot points at its rear which are attached to mountings provided on the front lateral member 22 to allow the leading arm to swing upwards and downwards (subject to the spring and damper units 60). Wheel hubs 62 are provided on the end of the leading-arms 58.

In this way, the suspension for the vehicle is attached directly to the central rigid box of the chassis. Suspension loads can therefore be carried with ease, providing a stable ride and handling characteristic and reducing the need for great strength (and hence weight) in more remote parts of the chassis such as the cabin. The use of a front leading suspension arm and a trailing rear suspension arm, combined with the bonding of a rigid stabilised composite panel to the load floor framework, results in a considerably smaller, lighter and stiffer central torsion box into which the suspension torsion and bending loadings are resolved.

FIG. 4 shows the complete vehicle. The chassis 10 supports a complete cabin 64 to the front of the vehicle, and the load space to the rear has additional side walls 66 and a tailgate 68. Wheels 70 are provided on the wheel hubs 54, 62.

It will of course be understood that many variations may be made to the above-described embodiment without departing from the scope of the present invention.

The invention claimed is:

1. A vehicle comprising:
    a chassis, comprising
        a flat framework comprising a pair of spaced-apart elongate longitudinal members connected by a pair of spaced-apart elongate lateral members, and bracing for the thus-defined framework comprising cross-members extending diagonally within the framework from the one lateral member to the other lateral member, joining at the centre of the framework;
    a rear suspension directly attached to the rearmost of the pair of lateral members and comprising a trailing-arm arrangement;
    a front suspension directly attached to the frontmost of the pair of lateral members and comprising a leading-arm arrangement.

2. The vehicle according to claim 1 in which the elongate members are substantially straight.

3. The vehicle according to claim 1 in which the elongate members are an open channel section.

4. The vehicle according to claim 1 in which the elongate members are a tubular section.

5. The vehicle according to claim 4 in which the elongate members are a box section.

6. The vehicle according to claim 4 in which the elongate members are a circular section.

7. The vehicle according to claim 1 in which the cross-members extend from one lateral member to the other.

8. The vehicle according to claim 7 in which the bracing comprises a panel attached to the framework.

9. The vehicle according to claim 8 in which the panel is bonded to the framework.

10. The vehicle according to claim 8 in which the panel is flat in the region attached to the thus-defined framework.

11. The vehicle according to claim 8 in which the panel is of a composite material.

12. The vehicle according to claim 11 in which the panel includes a glass fibre reinforcement.

13. The vehicle according to claim 11 in which the panel includes a carbon fibre reinforcement.

14. The vehicle according to claim 1 in which the rear suspension comprises a pair of trailing-arm suspension arms, each supporting a wheel.

15. The vehicle according to claim 1 in which the front suspension comprises a pair of leading-arm suspension arms, each supporting a wheel.

* * * * *

UNITED STATES PATENT AND TRADEMARK OFFICE
CERTIFICATE OF CORRECTION

PATENT NO. : 10,220,879 B2
APPLICATION NO. : 15/326188
DATED : March 5, 2019
INVENTOR(S) : James Dowle, Frank Coppuck and Ian Gordon Murray It is certified that error appears in the above-identified patent and that said Letters Patent is hereby corrected as shown below:

On the Title Page

Item (71), in the applicant's address, please delete "Shatford, Surrey (GB)" and insert -- Shalford, Surrey (GB) --

In the Claims

In Column 4, in Line 36, Claim 8, please delete "The vehicle according to claim 7 in which the bracing comprises a panel attached to the framework." and insert -- The vehicle according to claim 1 in which the bracing comprises a panel attached to the framework. --

Signed and Sealed this
Tenth Day of September, 2019

Andrei Iancu
*Director of the United States Patent and Trademark Office*